United States Patent
Kurz

(10) Patent No.: US 6,796,199 B2
(45) Date of Patent: Sep. 28, 2004

(54) DRIVE FOR MACHINE COMPONENTS SUCH AS CARRIAGES, GRIPPING DEVICES OR THE LIKE

(75) Inventor: Artur Kurz, Wendlingen (DE)

(73) Assignee: Gebr. Heller Maschinenfabrik GmbH, Nürtingen (DE)

( * ) Notice: Subject to any disclaimer, the term of this patent is extended or adjusted under 35 U.S.C. 154(b) by 0 days.

(21) Appl. No.: 10/117,464

(22) Filed: Apr. 5, 2002

(65) Prior Publication Data

US 2003/0029259 A1 Feb. 13, 2003

(30) Foreign Application Priority Data

Apr. 10, 2001 (DE) .......................................... 101 17 948

(51) Int. Cl.[7] .......................... F04B 21/02; F16H 27/02
(52) U.S. Cl. ................. 74/89.32; 74/89.38; 74/424.71; 74/89.34
(58) Field of Search ...................... 74/88, 89.23, 89.32, 74/89.38, 89.34, 112, 127, 424.71, 424.72, 424.75, 424.76

(56) References Cited

U.S. PATENT DOCUMENTS

| 2,261,450 A | * | 11/1941 | Pritchett | ..................... | 81/106 |
| 4,730,503 A | * | 3/1988 | Rosenthal | ..................... | 74/58 |
| 5,303,604 A | * | 4/1994 | Mayfield | ................. | 74/424.75 |
| 5,630,748 A | * | 5/1997 | Guenin | ........................ | 451/152 |
| 6,662,672 B2 | * | 12/2003 | Someya | ..................... | 74/89.23 |

FOREIGN PATENT DOCUMENTS

| DE | 39 38 353 | 5/1990 |
| EP | 1 013 373 | 6/2000 |

OTHER PUBLICATIONS

Heinrich Matuszewski, Handbuch Vorrichtungen: Konstruktion nd Einsatz, 1986, p. 123; Verlag Vieweg, Braunschweig, Germany.

* cited by examiner

Primary Examiner—David A. Bucci
Assistant Examiner—Colby Hansen
(74) Attorney, Agent, or Firm—Gudrun E. Huckett

(57) ABSTRACT

A drive for machine components has at least one threaded spindle having spindle sections with oppositely oriented axial pitch. Nuts are seated on the at least one threaded spindle and engage the spindle sections, respectively. At least one motor is connected to the at least one threaded spindle for driving the at least one threaded spindle. A first one of the nuts is connected to a machine component. A second one of the nuts is spatially stationary. The at least one threaded spindle provides a drive moment for driving the machine component.

24 Claims, 5 Drawing Sheets

DRIVE FOR MACHINE COMPONENTS SUCH AS CARRIAGES, GRIPPING DEVICES OR THE LIKE

BACKGROUND OF THE INVENTION

1. Field of the Invention

The invention relates to a drive for machine components such as carriages, gripping devices or the like, comprising at least one threaded spindle which can be driven by at least one motor and on which nuts are positioned, wherein at least one of the nuts is connected with the machine component and wherein the nuts are in engagement with spindle sections having oppositely oriented axial pitch.

2. Description of the Related Art

Because of the required precision, the axle movements of machine tools as well as simple and combined linear and rotational movements of workpieces and tools must follow very exactly, essentially without delay, and with a high degree of repeating accuracy the preset values of the numerical control, and this is to be achieved independent of the acting counter forces such as feed force, friction, or acceleration forces of the linearly or rotationally driven masses. The moving speed and the acceleration must be as high as possible in order to take up as little time as possible for a precise positioning.

In known drive systems a rotary current synchronous motor mounted on the machine frame drives a ball screw spindle rotatably supported on the machine frame. The spindle engages a nut which is fixedly connected in a carriage or a stand. The carriage or the stand are longitudinally movable on guides relative to the machine frame. As a function of the stroke length or the required rapid traverse of the carriage, the spindle and the nut have different limits of rotational speed. Above certain slenderness ratios, or for other constructive reasons, the ball screw spindle can also be positioned so as to be fixed in regard to rotation and the nut can be driven in rotation instead.

Moreover, drives are known from European patent application 1 013 373 A1 which provide a second drive motor for driving the threaded spindle or the nut for the purpose of increasing the moving speeds and accelerations.

Furthermore, spindle drive devices are known from German patent application 39 38 353 which, by means of two spindle drive heads and one spindle with right-hand and left-hand thread on the same threaded spindle section, perform translatory as well as rotary movements.

Also, threaded spindles are known which have left-hand and right-hand threads on two adjacent spindle sections and are used for a central clamping of workpieces (Heinrich Matuszewski, Handbuch Vorrichtungen: Konstruktion und Einsatz, Verlag Vieweg, 1986, page 123).

The technical limits of these known drive systems lie in the rotational speed rating of the ball screw spindles and in the rotational speed rating of commercial servo motors. The doubling of the moving speed requires for the same axial spindle pitch a doubling of the motor speed. When the motor speed increases past the speed of maximum torque, the motor torque decreases as a matter of the functional limitations of the motor, and this causes the acceleration to decrease. Also, when doubling the motor speed, the run-up time of the motor increases. An increase of the axial pitch is possible; however; this requires that the spindle diameter must be increased which would result in higher mass moments of inertia.

SUMMARY OF THE INVENTION

It is an object of the present invention to configure the drive of the aforementioned kind such that for high positioning speeds in the case of handling devices and high-speed cutting with machine tools the acceleration as well as the rapid traverse speeds and feed speeds are high.

In accordance with the present invention, this is achieved in that one of the two nuts is spatially fixed and that the drive moment is introduced via the threaded spindle.

With the drive according to the invention, the drive moment is introduced by means of the threaded spindle. By using a threaded spindle with two spindle sections having oppositely oriented pitch and a nut which is spatially fixed, an increase of the acceleration and of the moving speeds of the machine component is achieved for the same motor speed.

DESCRIPTION OF THE PREFERRED EMBODIMENTS

Figure 1:
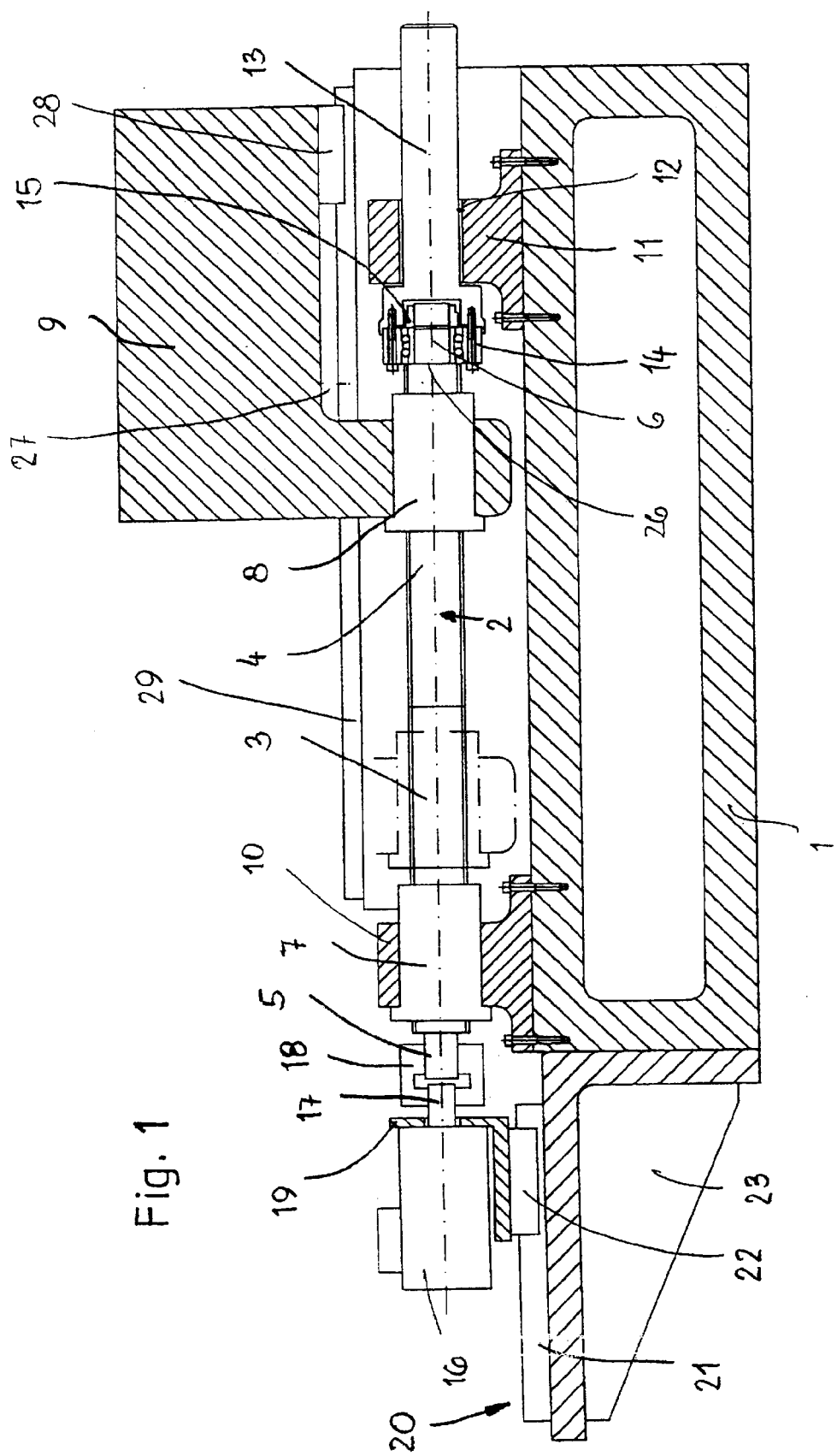
FIG. 1 is a sectional view of a first drive according to the invention for a machine component.

FIG. 1 shows a drive which is embodied as a feed drive with which, for example, carriages on machine tools can be moved. FIG. 1 shows such a machine with a machine frame 1 on which a threaded spindle 2 is rotatably supported. The spindle 2, which can be, for example, a ball screw spindle, is guided in a nut 7 which is connected fixedly in the axial and radial directions in the pillow block 10. This pillow block 10 is fastened on the machine frame 1. At a spacing from the nut 7, a further nut 8 is positioned on the spindle 2 which is secured in a carriage 9 so as to be immobile axially and radially. The threaded spindle 2 has two spindle sections 3 and 4 which have opposite axial pitch. The spindle section 3 can be, for example, a right-hand pitch and the spindle section 4 at the other end can be a left-hand pitch. The pitch directions of the nuts 7 and 8 are configured accordingly. For driving the spindle 2, a motor 16 is provided whose motor shaft 17 is aligned with the spindle 2 and is connected to the end 5 of the spindle 2 by the clutch 18 for rotating the spindle 2. The motor 16 is axially movable and is secured against rotation about the entire length of its travel stroke. For guiding the motor 16, a guide 20 is provided which is fastened on a console 23 which is fastened on a sidewall of the machine frame 1. The guide 20 has at least one guide path 21 provided on the console 23, and at least one guide shoe 22 is moveable on the guide path 21. The guide shoe 22 is provided on the underside of an angle member 19 which supports the motor 16.

The end 6 of the spindle 2 facing away from the motor 16 is connected by means of at least one bearing 14, preferably a rolling bearing, with an axle 13. The bearing 14 is axially secured by a nut 15 which is screwed onto the free spindle end 6. The bearing 14 rests under the force of the nut 15 on a shoulder 26 of the spindle 2.

The axle 13 is guided in a pillow block 11 with at least one longitudinal bearing 12 which can be a sliding bearing or a rolling bearing. Since the spindle 2 is supported in the area of both ends in the described way by means of two pillow blocks 10, 11, the rotational speed limit of the spindle 2 is increased so that high moving speeds are possible.

The carriage 9 is provided at the underside facing the machine frame 1 with a cutout 27 in which the pillow block 11, the spindle end 6, and the bearing 14 are positioned.

The carriage 9 is slidably supported by means of at least one guide shoe 28 in a guide 29 which is provided at a spacing above the guide 20 for the motor 16. In this way, the carriage 9 is not only guided by the nut 8 on the spindle 2, but also by the guide shoe 28 on the guide 29.

It is possible to configure the guide paths 21, 29 as a unitary part, as will be explained with the aid of the embodiment of FIG. 4 infra. In this case, the motor 16 and the carriage 9 are supported and guided on the same guide path.

The spindle 2 and the motor 16 form a drive train with the spindle 2 being rotated by the motor 16. The motor 16 and the parts which are axially fixedly connected with the motor shaft 17 move in the axial direction. As a result of the pitch direction of the nut 8 and the spindle section 4, which is opposite to the pitch direction of the nut 7 and the spindle section 3, the nut 8 moves axially relative to the spindle 2 when the spindle 2 rotates. The axial movement direction of the nut 8 is identical to the axial movement direction of the spindle 2, but the axial movement is performed at a higher speed.

Depending on the rotational direction of the motor shaft 17, the carriage 9 is moved in the corresponding direction on the machine frame 1. The movement transmitted onto the carriage 9 is a combination of the axial movement of the spindle 2 and the axial relative movement between the nut 8 and the spindle 2. The additive superposition of the movements results in higher travel speeds and accelerations.

The solid lines in FIG. 1 illustrate one of the end positions of the carriage 9. The dash-dotted line illustrates the other end position of the carriage 9 at maximum travel stroke.

Figure 2:
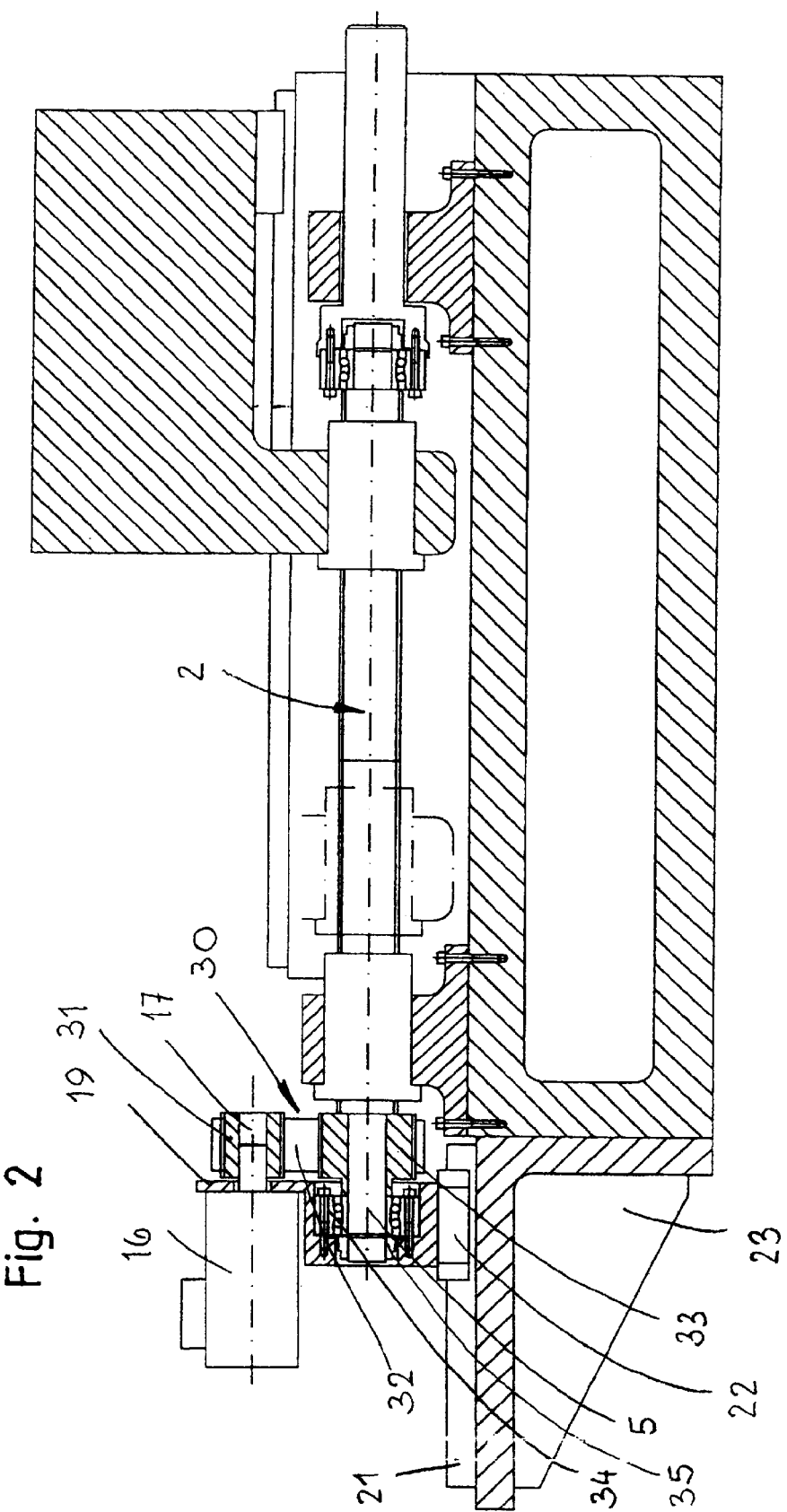
FIG. 2 is a sectional view of a second drive according to the invention for a machine component.

FIG. 2 shows an embodiment in which the motor 16 is positioned radially displaced to the spindle 2 on the support 19. In this case, the motor shaft 17 is not connected directly with the spindle 2 but by means of a gear or a transmission, for example, a belt drive 30. A pulley 31 is seated on the motor shaft 17 and is connected drivingly by means of a belt 32 with the pulley 33 which is seated fixedly on the spindle end 5. The support 19 is supported by the guide shoe 22 on the guide path 21 on the console 23. The spindle end 5 is rotatably supported by at least one bearing 34, preferably a rolling bearing, in the support 19. The bearing 34 is axially secured by a nut 35 which is screwed onto the free end of the spindle end 5.

In other respects, this embodiment is identical to the embodiment of FIG. 1. Since the motor 16 is not positioned axially behind the spindle 2 but in the area above the spindle 2, this configuration is shorter than that of the embodiment of FIG. 1.

Figure 3:
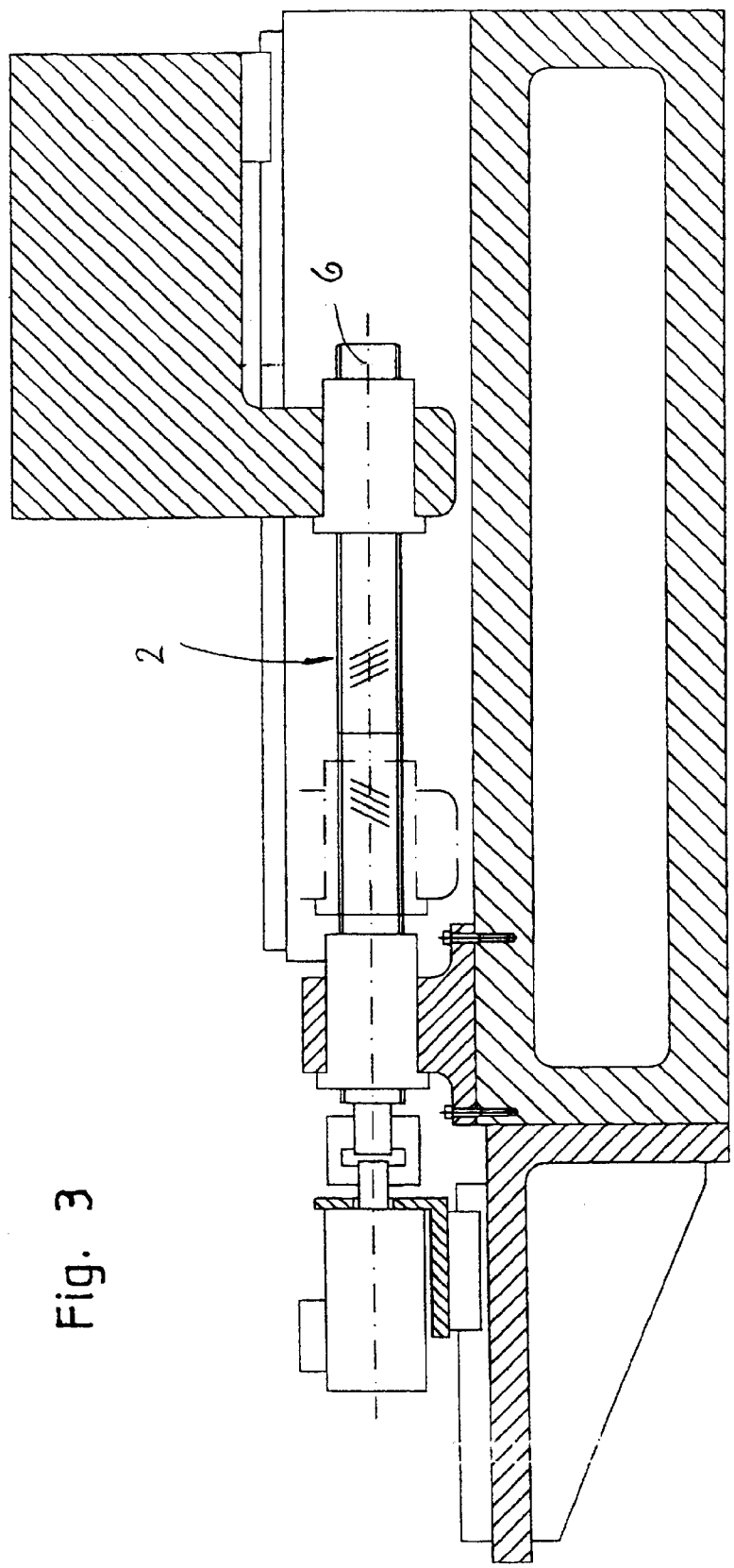
FIG. 3 is a sectional view of a third drive according to the invention for a machine component.

FIG. 3 shows a drive system in which the spindle 2 is supported on one end only. On the spindle end 6 no support and bearing are provided so that the constructive configuration of this embodiment is simpler than that of the two previously described embodiments. In other respects, the drive system according to FIG. 3 is identical to the one of FIG. 1. However, it is also possible to provide this one-sided support of the spindle 2 in connection with an embodiment according to FIG. 2. The drive system according to FIG. 3 is suitable advantageously for relatively short travel strokes. As in the preceding embodiments, high-speeds and accelerations can be achieved.

Figure 4:
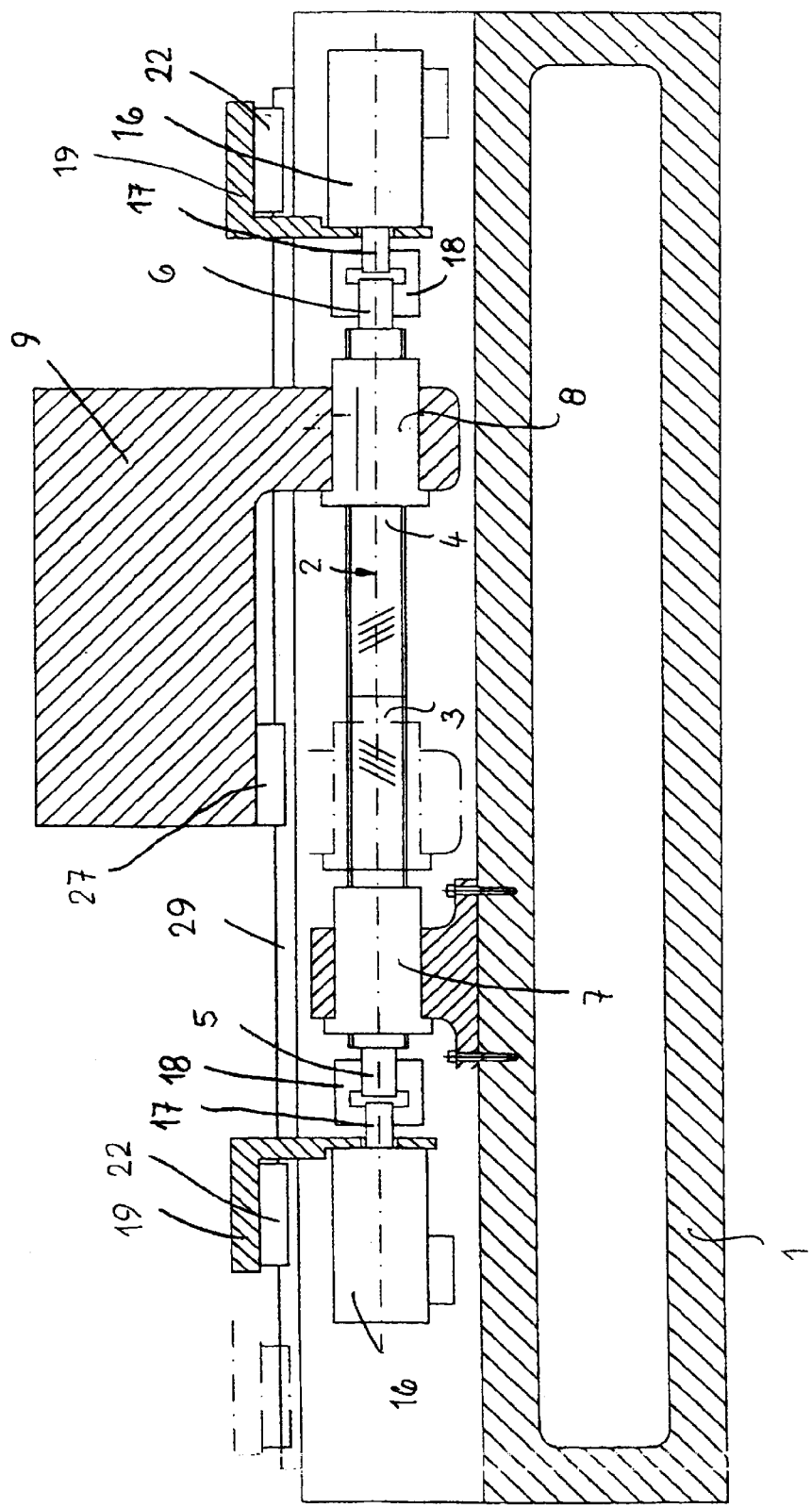
FIG. 4 is a sectional view of a fourth drive according to the invention for a machine component.

FIG. 4 shows a drive system in which a second motor 16 is provided on the spindle end 6. In this way, the spindle 2 is driven at both ends 5, 6 by a motor 16, respectively. Each motor 16 is aligned with the spindle 2. The two motor shafts 17 are fixedly connected by a clutch 18 with the respective spindle end 5, 6 for rotating the spindle 2.

The two motors 16 are mounted on angle supports 19 which, in contrast to the embodiment of FIG. 1, is movable on the guide path 29 with the guide shoe 22. The carriage 9 is supported with its guide shoe 27 on the same guide path 29. The motors 16 are fastened on the downwardly extending legs of the angle support 19 and have a minimal spacing from the machine frame 1.

In accordance with the preceding embodiments, the spindle 2 has spindle sections 3, 4 with opposite axial pitch and nuts 7 and 8 correlated therewith, respectively. The two supports 19 are positioned mirror-symmetrically to one another wherein the motors 16 are covered relative to the spindle 2 by the downwardly extending legs of the support 19. Since the spindle 2 is driven in rotation at both ends, it is possible to move even heavy loads on the carriage 9 at high speed and high acceleration. In FIG. 4, the solid lines show again one end position and the dash-dotted lines shows the other end position of the carriage 9. Since the connection of the motors 16 at both spindle ends 5, 6 is realized by identical parts, a very simple configuration is provided.

Figure 5:
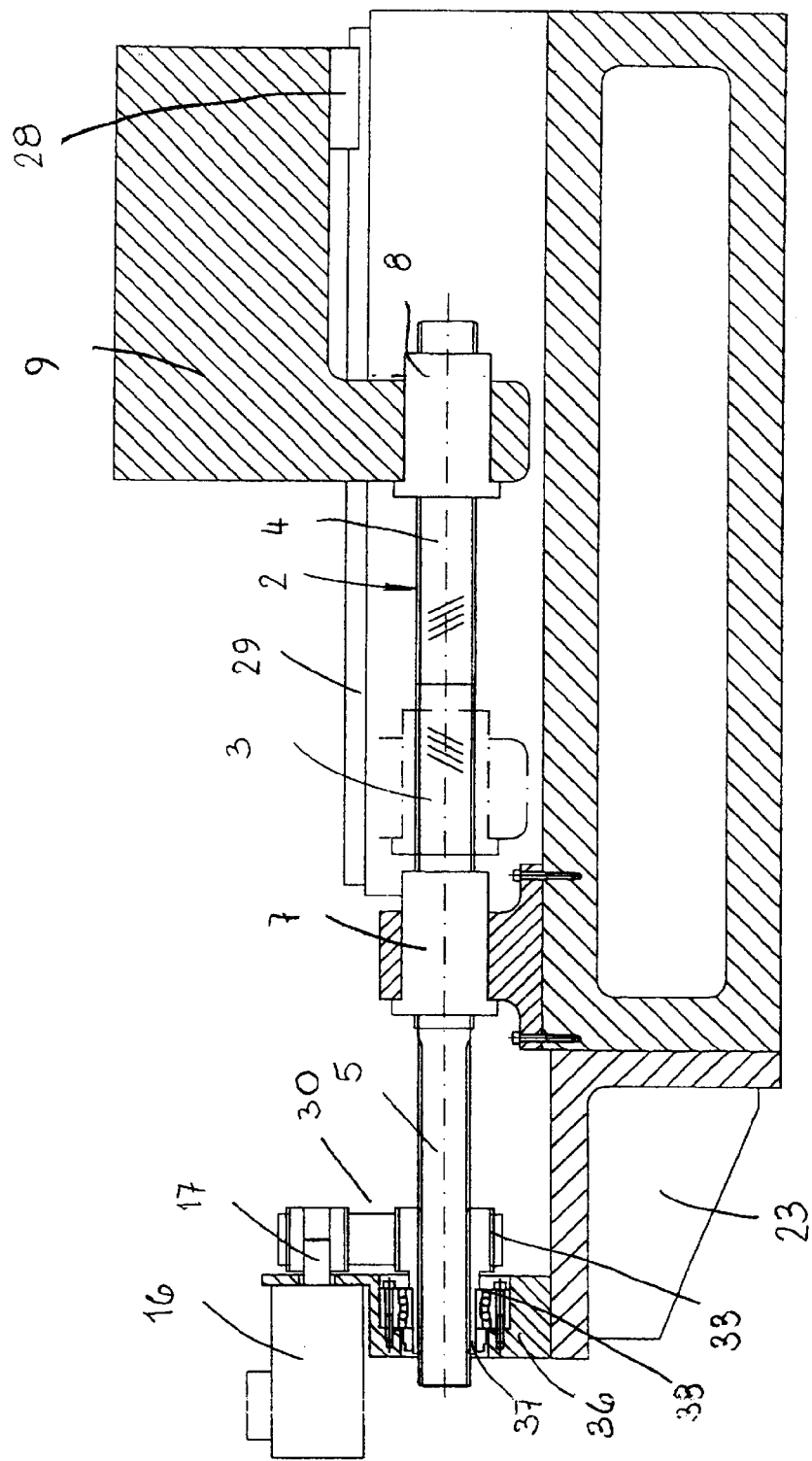
FIG. 5 is a sectional view of the fifth drive according to the invention for a machine component.

FIG. 5 shows a drive system in which the motor 16 is mounted axially immobile on the console 23 by means of a console 36. The motor shaft 17 according to the embodiment of FIG. 2 is in driving connection with the spindle end 5 via the belt drive 30. In contrast to the embodiment of FIG. 2, the pulley 33 is axially fixedly seated on the spindle end 5 and is provided on a sleeve 37 which is fixedly seated on the end 5 of the spindle 2 embodied as a spline shaft. The sleeve 37 is rotatably supported by at least one bearing 38, preferably a rolling bearing, in the console 36.

When the spindle 2 is rotated by the motor 16 by means of the belt drive 30, the spindle end 5 moves in the axial direction relative to the axially stationary pulley 33. Since the motor 16, in contrast the preceding embodiments, is not axially moved by the belt drive 30, the moved masses are minimal. This enables high speeds and accelerations. For reasons of precision, the spindle end 5, formed as a spline shaft, engages the pulley 33 via a bearing 38 which is embodied as a prestressed linear rolling guide.

The spindle 2 is supported otherwise in the nuts 7, 8 which have correlated therewith the spindle sections 3, 4 provided with opposite axial pitch. The carriage 9 is supported by means of the guide shoe 28 on the linear guide 29. The carriage 9 is moved by rotation of the spindle 2 in the same way as in the preceding embodiments. In FIG. 5, the two end positions of the carriage 9 are illustrated by solid and dash-dotted lines, respectively.

In all embodiments, the spindle sections 3, 4 can have same or different pitch and/or the same or different diameter and/or the same or different length. With appropriate selection of these parameters, an optimal adjustment of the drive to the respective application is possible. As a result of the described embodiments, the travel stroke of the motor 16 in the different embodiments is smaller than the travel stroke of the carriage 9; preferably, it is only approximately half the travel stroke of the carriage 9.

While specific embodiments of the invention have been shown and described in detail to illustrate the inventive principles, it will be understood that the invention may be embodied otherwise without departing from such principles.

What is claimed is:

1. A drive for machine components comprising:
   at least one threaded spindle having spindle sections with oppositely oriented axial pitch;
   nuts seated on the at least one threaded spindle and engaging the spindle sections, respectively;
   at least one motor connected to the at least one threaded spindle for driving the at least one threaded spindle;
   wherein a first one of the nuts is connected to a machine component;
   wherein a second one of the nuts is spatially stationary; and
   wherein the at least one threaded spindle provides a drive moment for driving the machine component.

2. The drive according to claim 1, wherein the spindle sections have an identical axial pitch or a different axial pitch.

3. The drive according to claim 1, wherein the spindle sections have an identical diameter or a different diameter.

4. The drive according to claim 1, wherein the spindle sections have an identical length or a different length.

5. The drive according to claim 1, wherein the spindle sections are connected to one another so as to prevent relative rotation to one another.

6. The drive according to claim 1, wherein the at least one motor is drivingly connected to one end of the at least one threaded spindle.

7. The drive according to claim 6, further comprising a clutch, wherein the at least one motor has a motor shaft fixedly connected to the end of the at least one threaded spindle via the clutch.

8. The drive according to claim 6, further comprising a gear, wherein the at least one motor has a motor shaft drivingly connected to the end of the at least one threaded spindle via the transmission.

9. The drive according to claim 8, wherein the gear is a belt drive.

10. The drive according to claim 1, wherein the at least one threaded spindle has a first end and a second end, wherein the first and second ends have one of the at least one motors drivingly connected thereto, respectively.

11. The drive according to claim 1, wherein the second nut is mounted axially and radially immobile on a machine frame supporting the machine component and is configured to guide the at least one threaded spindle.

12. The drive according to claim 1, wherein the first nut is arranged axially and radially immobile in the machine component.

13. The drive according to claim 1, wherein the at least one motor and the at least one threaded spindle form a drive train and wherein the drive train performs an axial movement when the at least one threaded spindle rotates.

14. The drive according to claim 13, wherein the machine component performs a movement as soon as the at least one threaded spindle rotates.

15. The drive according to claim 14, wherein the movement of the machine component results from the axial movement of the at least one threaded spindle and an axial relative movement between the first nut and the at least one threaded spindle.

16. The drive according to claim 15, wherein the axial movement of the at least one threaded spindle and the axial relative movement of the first nut and the at least one threaded spindle are additively superimposed.

17. The drive according to claim 13, comprising at least one guide configured to support the at least one motor against rotation along a travel path during the axial movement of the drive train.

18. The drive according to claim 17, wherein the at least one guide is a linear guide configured to receive great lateral forces.

19. The drive according to claim 18, wherein one end of the at least one threaded spindle is a spline shaft.

20. The drive according to claim 18, wherein one end of the at least one threaded spindle is a play-free guide.

21. The drive according to claim 20, wherein the travel stroke of the at least one motor is approximately half of the travel stroke of the machine component.

22. The drive according to claim 13, wherein the at least one motor has a travel stroke that is smaller than a travel stroke of the machine component.

23. The drive according to claim 1, wherein the at least one threaded spindle has a first end and a second end and wherein first and second ends are supported.

24. The drive according to claim 1, comprising a common guide path, wherein the machine component and the at least one motor are guided on the common guide path.

* * * * *